United States Patent [19]

Lee

[11] 4,048,290

[45] Sept. 13, 1977

[54] PROCESS FOR THE PRODUCTION OF FINELY-DIVIDED METAL AND METALLOID OXIDES

[75] Inventor: Kam Bor Lee, Chelmsford, Mass.

[73] Assignee: Cabot Corporation, Boston, Mass.

[21] Appl. No.: 653,116

[22] Filed: Jan. 28, 1976

[51] Int. Cl.² .................. C01B 33/18; C01B 13/14
[52] U.S. Cl. .................. 423/336; 23/277 R; 423/592; 423/612; 423/659; 423/625; 423/608; 423/617; 106/288 B; 106/300; 252/455 R; 252/463; 431/3; 431/32; 431/326
[58] Field of Search .............. 423/336, 337, 592, 612, 423/659 R; 23/277 R; 431/3, 32, 326

[56] References Cited

U.S. PATENT DOCUMENTS

| | | | |
|---|---|---|---|
| 2,990,249 | 6/1961 | Wagner | 423/336 |
| 3,069,281 | 12/1962 | Wilson | 23/277 R |
| 3,086,851 | 4/1963 | Wagner | 23/277 R |
| 3,130,008 | 4/1964 | Stokes et al. | 423/336 |
| 3,297,411 | 1/1967 | Dear | 423/612 |
| 3,355,253 | 11/1967 | Tillman et al. | 23/277 R |
| 3,475,124 | 10/1969 | Dorn et al. | 23/277 R |
| 3,647,377 | 3/1972 | Hilgers et al. | 23/277 R |
| 3,663,283 | 5/1972 | Hebert et al. | 423/336 |
| 3,694,168 | 9/1972 | Hilgers et al. | 431/32 |
| 3,954,945 | 5/1976 | Lange et al. | 423/336 |
| 3,959,439 | 5/1976 | Pope | 423/495 |

FOREIGN PATENT DOCUMENTS

| | | | |
|---|---|---|---|
| 726,250 | 3/1955 | United Kingdom | 423/612 |

*Primary Examiner*—Herbert T. Carter
*Attorney, Agent, or Firm*—Jack Schuman; Barry R. Blaker; Lawrence A. Chaletsky

[57] ABSTRACT

There is provided a process and apparatus for the production of finely-divided metal and metalloid oxides by flame hydrolysis of corresponding metal and metalloid halides whereby burner fouling is minimized and burner fabrication is facilitated by transpiration of a fuel gas or vapor along the boundaries of each halide-containing stream as it is discharged from the burner into a reaction zone.

6 Claims, 1 Drawing Figure

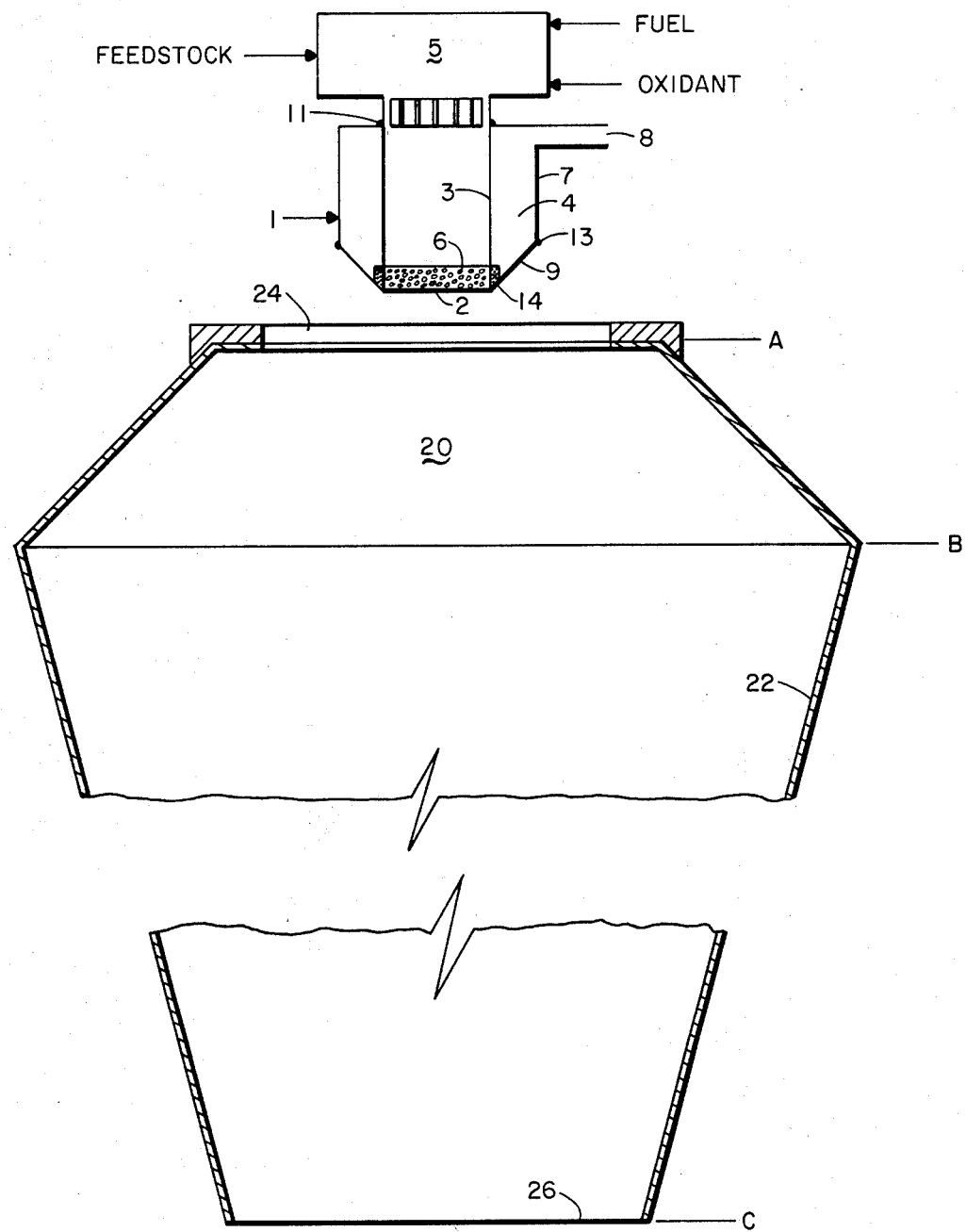

PROCESS FOR THE PRODUCTION OF FINELY-DIVIDED METAL AND METALLOID OXIDES

The present invention relates generally to the production of finely-divided metal and metalloid oxides by high temperature decomposition of a corresponding metal or metalloid feedstock and is more particularly concerned with the production of finely-divided metal or metalloid oxides by flame hydrolysis of corresponding metal or metalloid halide feedstocks in the vapor phase.

Flame hydrolysis of vaporized metal or metalloid halide feedstocks to produce corresponding finely-divided oxide products is, broadly, a well-known and extensively practiced art. In such processes, a hydrolyzable metal or metalloid halide feedstock is vaporized and co-mingled with a flame formed by combustion of a water-producing, hydrogen-containing fuel with an oxygen-containing gas. The combustion reaction results in the production of (1) sufficient water to hydrolyze the feedstock in the vapor phase to the corresponding oxide and (2) sufficient auxiliary heat to support the normally endothermic nature of the hydrolysis reaction and to promote the thermal environment necessary to produce the desired product. The resulting reaction products, comprising the finely-divided oxide entrained in by-product reaction gases, are subjected to conventional cooling and solid product separation techniques, the separated by-product gases, including hydrogen halide, being disposed of or otherwise treated so as to recover valuable components thereof. For instance, where the flame hydrolysis process is integrated with a process for hydrochlorination of a metal or metalloid-bearing feedstock, the latter process resulting in vaporizable, hydrolyzable feedstock product. The hydrogen halide by-product of the flame hydrolysis reaction can generally be separated from the hydrolysis off-gases and recycled into the hydrochlorination step so as to form a closed loop in the integrated overall process.

The finely-divided metal or metalloid oxide products producible by flame hydrolysis of corresponding metal or metalloid halide feedstocks are useful in various applications. For instance, finely-divided titania, vanadia and zirconia find utility as fillers and pigments in diverse polymers and elastomers and as catalysts and catalyst supports. Finely-divided antimony oxide is useful as a flame retardant when dispersed in polymeric materials. Finely-divided alumina is useful as a filler for various matrices and finds additional utility as an anti-static and anti-soil agent when applied to textiles and as a frictionizing or anti-slip agent when applied to paper products or to textile fibers prior to spinning thereof. Coformed oxides produced by way of the flame hydrolysis process, such as silica/alumina or titania/alumina also find utility in catalytic applications.

Finely-divided silica products presently represent the preponderance of the metal or metalloid oxides commercially produced by flame hydrolysis. These silica products are characterized by their relatively high purity, amorphous crystal structure, small particle size and tendency to form gel-like networks when dispersed in various organic liquids. The flame hydrolysis silicas are used as reinforcing fillers in elastomers, particularly silicone elastomers; as rheology control and thickening agents in organic liquids; as flow and sag control agents in caulk, sealant and adhesive compositions, as anti-blocking agents for plastics and rubbers and adhesive coatings, and as free flow agents in various powdered products.

One of the problems faced by manufacturers of flame hydrolysis metal and metalloid oxide products resides in the tendency for solid products of the hydrolysis reaction to deposit on the discharge end or mouth of the burner through which the reactants are introduced into the flame hydrolysis reaction zone. This deposition phenomenon is known variously as "whiskering", "bearding" or, simply, "burner fouling".

Burner fouling is deleterious in flame hydrolysis metal or metalloid oxide processes since, if sufficiently extensive, it can adversely affect the geometry and smoothness of the hydrolysis flame and thus lessen the facility by which the process is carried out as well as render the finely-divided metal or metalloid oxide product non-uniform. Thus, substantial efforts are usually made to minimize burner fouling or at least limit the extent to which it occurs. For instance, burner fouling can generally be periodically mechanically removed from the burner mouth prior to deleterious build-up thereof. preferably, the burner and the process stream(s) are designed so as to minimize the rate at which such fouling occurs. As an example of this latter, for instance, there is disclosed in U.S. Pat. No. 2,990,249, Wagner, June 27, 1961, a technique by which burner fouling is minimized comprising the introduction of an inert gas stream adjacent the hydrolysis reactant mixture stream. This is accomplished by charging the inert gas through an annular slit located at and completely surrounding the burner mouth. This technique is said to mitigate against burner fouling by serving to mechanically remove the hydrolysis reaction from the region of the burner mouth and by localized dilution of the hydrolysis reactants in this region such that the rate of ignition of the reactants is reduced to the point that ignition occurs only at some point removed from the burner mouth. In short, the technique disclosed by Wagner avoids anchoring of the hydrolysis flame directly on the burner mouth and provides a continuous washing action of the burner mouth so as to physically remove solid produce deposits therefrom. The anti-fouling method disclosed in the Wagner patent mentioned above has been found to be effective; however, it is not normally performed without difficulty. Specifically, the technique of Wagner requires provision of a relatively thin, fully circumscribing annular slit about the burner mouth so as to allow the generation of sufficient velocity in the inert gas stream without undue dilution of the hydrolysis reactant stream. This thin annular slit, however, is difficult to perform in terms of burner fabrication, it being an arduous task to hold close annular width and concentricity tolerances in utilizing conventional metal fabrication and welding techniques. Too, even upon successful fabrication, the thin inert gas annulus represents a tender structure which is readily damaged. In accordance with the present invention, these problems have been substantially reduced.

It is an object of the invention to provide a novel process for the production of finely-divided metal or metalloid oxides by vapor phase flame hydrolysis of a corresponding metal or metalloid halide feedstock.

It is another object of the invention to provide an improved process for the production of finely-divided metal or metalloid oxides by vapor phase flame hydrolysis of a corresponding metal or metalloid halide feedstock, the process being characterized by its relative freedom from the problem of burner fouling.

It is yet another object of the invention to provide an improved process for the production of finely-divided silica by vapor phase flame hydrolysis of a silicon halide feedstock, the silica products of the process being characterized by good liquid thickening properties.

It is another object of the invention to provide a novel burner for the production of finely-divided metal and metalloid oxides by vapor phase flame hydrolysis of metal and metalloid halide feedstocks and which burner is characterized by its relative freedom from fouling.

It is yet another object of the invention to provide a novel burner for the production of finely-divided metal and metalloid oxides by vapor phase flame hydrolysis of metal and metalloid halide feedstocks, which burner is characterized by its relative ease of fabrication.

Other objects of the invention will, in part, appear hereinafter and will, in part, be obvious.

THE DRAWING

The drawing forming part hereof is a schematic, diagrammatic longitudinal section of a flame hydrolysis burner/reaction chamber system representative of one embodiment of the invention.

SUMMARY OF THE INVENTION

In accordance with the invention, it has been discovered that the above and other objects and advantages can be achieved when a hydrogen-containing fuel gas or vapor is transpired along the boundaries of the metal or metalloid halide-containing reactant stream(s) during discharge thereof from the burner mouth. The improved burner apparatus of the invention comprises one or more conduit means adapted to receive and conduct flame hydrolysis reactants comprising a hydrolyzable metal or metalloid feedstock in vapor form, a hydrogen-containing fuel gas and oxidant, either separately or in admixture, into a reaction zone; porous diffusion means adjacent and surrounding the discharge end(s) of a least those pathways defined by said conduits through which the metal or metalloid halide reactant is conveyed and means to supply a hydrogen-containing gas or vapor through said diffusion means.

DESCRIPTION OF PREFERRED EMBODIMENTS

The metal or metalloid halide feedstocks useful in the practice of the invention include substantially any hydrolyzable vaporizable metal or metalloid halide capable of undergoing hydrolysis under the conditions imposed thereon in the hydrolysis flame. Exemplary metal and metalloid halides are; vanadium, tetrachloride, titanium tetrachloride, titanium tetrabromide, zirconium tetrachloride, aluminum trichloride, zinc chloride, antimony trichloride and the like. included among suitable silicon halides are silicon tetrachloride, silicon tetrafluoride, methyltrichlorosilane, trichlorosilane, dimethyldichlorosilane, methyldichlorosilane, methyldichlorofluorosilane, dichlorosilane, dibutyldichlorosilane, ethyltrichlorosilane, propyltrichlorosilane and mixtures thereof. Where co-formed oxides are desired it is, of course, apparent that the feedstock can comprise compatible mixtures of the corresponding metals or metalloid halides.

Substantially any vaporizable or gaseous combustible hydrogen-containing fuel may be employed in the preparation of the hydrolysis reactant mixture, it being of primary importance that the fuel produce water as a product of its combustion with oxygen. Exemplary fuels are hydrocarbons such as methane, natural gas, refinery gas, ethane, propane, acetylene, butane, butylene, ethylene, pentane or propylene as well as normally liquid but vaporizable fuels such as aliphatic, aromatic, or alicyclic hydrocarbons. Hydrogen is also a suitable fuel and is generally preferred by reason of the high combustion temperatures attainable therewith. The hydrogen-containing fuel used as the transpirant and the hydrolysis fuel can, of course, be represented by the same species or can be different, the criteria set forth above with respect to the reactant fuel being equally applicable to the vapor or gas employed as the transpirant. It should be noted that the transpirant fuel employed in the present invention is distinguishable from the inert gases disclosed in U.S. Pat. No. 2,990,249. Specifically, the transpirant fuels of the present invention are necessarily ultimately reactive water and heat producing participants in the hydrolysis reaction zone whereas the gases proposed in the U.S. Pat. No. 2,990,249 patent are intended to be inert and thus perform solely as diluents in the hydrolysis reaction.

Oxygen, of course, is the oxidant for the combustion of the water-producing fuel in the process of the invention and may be employed in its pure state or admixed with inerts. Thus, oxygen, air, or oxygen enriched air may be conveniently employed as the oxidant in the process. However, if desired, it is also within the ambit of the invention to employ oxygen admixed with such inert gases as nitrogen, argon, helium or carbon dioxide.

For a clearer understanding of the invention reference is now made to the drawing wherein burner 1 broadly comprises at least one conduit 3 defining an enclosed pathway through which the frame hydrolysis reactants, comprising the hydrolyzable metal or metalloid halide feedstock, water-producing hydrogen-containing fuel and oxygen-containing oxidant, are introduced into a reaction zone 20. The reactants may be totally or partially premixed such as by means of a premixing chamber 5 adapted to preliminarily receive the separate reactant streams and mix them prior to entry thereof into conduit 3. However, the hydrolysis reactants can also be wholly or partially mixed within reaction zone 20 upon discharge from burner mouth 2. With respect to this last, for instance, burner 1 can comprise a number of separate conduits 3 through which the reactants are separately charged into the reaction zone 20 and caused to mix therein.

Reaction zone 20 is desirably enclosed by a reaction chamber 22 having an inlet 24 at one end thereof to receive the efflux of burner 1 and, if desired, to provide access for the intake of a quench fluid, such as air, into the reaction chamber. outlet 26 is provided for purposes of removal of the flame hydrolysis reaction products from chamber 22 for such subsequent treatment as may be necessary or desired.

In accordance with the invention, each conduit 3 difining a pathway for the conveyance of the vaporized metal or metalloid halide feedstock is equipped with a porous diffusion member 6 surrounding the boundary of the pathway at the discharge end thereof. in the particular embodiment shown in the drawing burner 1 is adapted for premix operations, in other words, for operations wherein the hydrolysis reactants are mixed prior to entry thereof into a single conduit 3 and the completed reactant mixture, comprising the vaporized metal or metalloid halide reactant, is discharged as a single stream from burner mouth 2. Therefore, since the single conduit 3 shown defines the sole boundary of the reactant stream containing the metal or metalloid halide feedstock, the discharge end thereof is defined by a diffusion member 6 comprising a porous ring or collar which completely surrounds the periphery of the feedstock-containing reactant stream at the point of discharge thereof from the burner. plenum 4 constitutes a flow chamber for supplying the transpirant fuel to porous member 6 and is defined by spacing a jacket 7 from conduit 3 and sealing said jacket at its lower end to the discharge end of porous member 6 and at its upper end to conduit 3. In turn, plenum 4 is equipped with inlet means 8 through which transpirant fuel gas or vapor is admitted. Where burner 1 comprises a plurality of conduits 3, such as a number of conduits concentrically positioned within one another so as to define one or more annular pathways, it will be recognized that it is fully intended that the discharge ends of at least those conduits 3 defining the boundaries of the metal or metalloid halide feedstock pathways will each comprise diffusion members 6 and means to supply transpirant fuel therethrough. In these plural conduit 3 situations it is preferred that the discharge ends of all conduits 33 be equipped with the diffusion members 6 and transpirant fuel supply means of the invention, irrespective of the composition of the particular process stream to flow therethrough and irrespective of the specific geometry by which the conduits 3 are arranged.

In operation of the particular burner embodiment depicted in the drawing, the hydrolysis reactants are introduced into premix chamber 5 in appropriate proportions and the resulting reactant mixture conveyed through conduit 3 and discharged into reaction zone 20 through burner mouth 2. The reactant mixture is ignited and burned in zone 20 to provide the flame hydrolysis reaction. The transpirant fuel gas or vapor is admitted into plenum 4 through inlet 8 and is transpired through porous member 6 along the boundary of the discharging metal or metalloid halide-containing reactant mixture immediately adjacent burner mouth 2.

While there is no intent to be bound by this explanation, it is thought that transpiration of the fuel gas or vapor along the boundary of each metal or metalloid halide feedstock stream as it is discharged from the burner mouth provides a uniform and laminar boundary layer of gas or vapor through which the metal or metalloid halide feed-stock containing stream is projected into reaction zone 20. The provision of a laminar boundary layer at this point in the flow of vaporized feedstock is believed important in mitigating against the development of recirculation patterns adjacent burner mouth 2 and thus avoids or minimizes contact between burner mouth 2 and solid product being formed in hydrolysis zone 20. Further, transpiration of a fuel gas or vapour along the boundary of a premixed feedstock/fuel/oxidant stream in the manner of the invention also tends to establish a fuel-rich zone immediately adjacent the surface of burner mouth 2, thus creating a slight but important delay in ignition of the hydrolysis reactant mixture and mitigating against solid product formation within this fuel-rich zone.

The rate at which the transpirant fuel is supplied to the diffusion member(s) 6 is subject to considerable variation and depends upon such variables as: burner size and geometry; the number and sizes of burner conduits earmarked for conveyance of the feedstock-containing streams; the flow rates of the various hydrolysis reactants introduced into the reaction zone through the burner; the concentration of metal or metalloid halide feedstock in the reactant stream(s); whether or not the hydrolysis reactants are premixed and, if so, the relative concentrations of each in the reactant mixture; the concentrations of diluents employed, if any, and the like. Suffice it to say, therefore, that the quantity of hydrogen-containing fuel supplied as the transpirant through the porous diffusion member(s) 6 should obviously be at least sufficient to have good effect on the burner fouling phenomenon. With this goal in mind, the quantity of transpirant fuel to be employed for any given set of process and apparatus circumstances can generally be readily determined in practice.

Fabrication of burner apparatus of the invention is generally accomplished with considerably greater facility than is fabrication of a similar burner employing thin annular slit(s) for injection of inert purge or wash gases. Referring again to the drawing, fabrication of the discharge end of burner 1 can be accomplished by, seriatim: welding cylindrical jacket 7 at its upper closure 11 to the exterior of conduit 3; mating a ring-shaped porous diffusion ring member 6 of somewhat greater than finish length against the discharge end of conduit 3; slipping a conically-shaped shoulder member 9 over the diffusion member 6 and butt welding the upper edge thereof at 13 to the lower edge of jacket 7; lightly welding the lower edge of conical shoulder 9 to the outer surface of diffusion member 6 and grinding off the excess length of diffusion member 6 so as to provide a terminal edge 14 thereon which is essentially co-extensive with the exterior surface of conical shoulder 9.

There follow non-limiting illustrative examples:

EXAMPLE 1

Burner/reaction chamber equipments of the general types shown in the drawing are employed having the following pertinent features:

| | |
|---|---|
| Conduit 3 | 1.61 inches I.D.; |
| Diffusion member 6 | sintered stainless steel having a porosity of about 50u, and I.D. of about 1.61 inch; a length along the internal surface thereof of about 0.75 inches and a thickness of about 0.125 inch. |
| Reaction chamber 22 | Internal diameter at A — 3 in. |
| | Internal diameter at B — 15.25 in. |
| | Internal diameter at C — 8 in. |
| | Axial length A to B — 10.25 in. |
| | Axial length B to C — 96 in. |

The reactants employed are as follows:

Feedstock, silicon tetrachloride vapors preheated to about 325° F.

Hydrogen-containing fuel, hydrogen preheated to about 160° F.

Oxidant, air at about ambient temperature.

The hydrogen and air reactants are introduced into mixing chamber 5 at the rates of 1021 SCFH and 2430 SCFH, respectively and the mixture is ignited upon discharge from burner mouth 2. Vaporized silicon tetrachloride feedback is then introduced into chamber 5 at a rate of about 222 lbs/hour and hydrogen is introduced into plenum 4 through inlet 8 at a rate of 305 SCFH. The total amount of reactant and transpirant hydrogen supplied to the burner is equivalent to 150% of that theoretically required, based on the potential water content thereof, to completely covert the silicon tetrachloride feedstock to silica. The quantity of air charged into mixing chamber 5 is equivalent to 100% of that theoretically required to result in complete combustion of the hydrogen fuel components to water. Quench air is inducted from the atmosphere into reaction chamber 22 through inlet 24 and the reaction products are removed through outlet 26, cooled and the silica product collected therefrom. The hydrolysis reaction proceeds smoothly and is conducted over a period of about three hours, during which period no deleterious burner fouling takes place.

During the course of the above run three samples of the silica product are collected and are subjected to surface area and thickening efficiency analyses thereof.

The surface areas of the silica samples are determined in accordance with the well-known BET technique utilizing nitrogen isotherms. The BET (Brunauer-Emmet-Teller) method is completely described in an article appearing in the *Journal of the American Chemical Society*, Vol. 60, page 309 (1938).

The thickening efficiencies of the collected silica samples are determined by comparison of their individual thickening performances in a standard polyester resin liquid against that of a standard flame hydrolysis silica, Cab—O—Sil M-5, a silica produced by Cabot Corporation, Boston, Mass., and having a BET-$N_2$ surface area of 200 ± 25 $m^2/g$. In this test, six and one half grams of the silica standard and the silica under test are each dispersed in separate 394 gram batches of an unpromoted polyester resin, Polylite 31007, Reichold Chemicals, Inc., White Plains, N.Y. The dispersion is carried out in a Premier Dispersator, Premier Mill Corp., New York, N.Y. for a period of 5 minutes and at a shaft speed of 3000 r.p.m. The resulting silica/polyester samples are then transferred into separate glass jars which are capped and placed in a constant temperature water bath for a period of about 4 hours, the bath being maintained at a temperature of 77° F. Next, the silica/polyester samples are subjected to viscometric analyses by means of a Brookfield Model LVT Viscometer, Brookfield Engineering Laboratories, Inc., Stoughton, Mass. The thickening efficiency of the test silica is then expressed as follows:

$$\text{Thickening Efficiency (\%)} = \frac{\text{Test silica/polyester viscosity}}{\text{Standard silica/polyester viscosity}} \times 100$$

The results of the above tests are averaged and the silica collected from the flame hydrolysis run is found to have an average BET-$N_2$ surface area of about 240 $m^2/g$ and an average thickness efficiency of about 122% of the standard.

When the above run is repeated with the exception that the burner employed comprises an annular slit of 0.20 inch width through which to introduce the transpirant hydrogen rather than a diffusion member 6, it is noted that little burner fouling occurs. However the collected silica product is determined to have an average BET-$N_2$ surface area of 244 $m^2/g$ and an average thickening efficiency of only about 113% of the standard silica. Accordingly, transpiration of the fuel gas along the boundary of the metal or metalloid halide-containing stream as opposed to introduction thereof through an adjacent annular slit results in a finely-divided silica product having improved thickening efficiency.

EXAMPLE 2

Burner apparatus of the invention, as employed in the first run of Example 1, is used in the preparation of various flame hydrolysis oxides, including: zirconia, vanadia, titania, silica/alumina and silica/titania. The feedstocks employed are charged into the burner apparatus in the vapor phase and are represented by the corresponding metal chlorides or, in the case of the co-formed oxides, by mixtures of the corresponding metal and metalloid chlorides. Burner operation in each run is characterized by a lack of deleterious accrection or fouling of the burner mouth when, in accordance with the invention, a hydrogen-containing fuel gas or vapor is transpired adjacent the boundary of the feedstock-containing stream being discharged from the burner.

What is claimed is:
1. In a process for the production of finely-divided metal or metalloid oxides by vapor phase hydrolysis of corresponding metal or metalloid halide feedstocks in the presence of a flame provided by combustion of a hydrogen-containing fuel with an oxygen-containing gas, the improvement which comprises: flowing the feedstock vapor through burner means as one or more enclosed streams thereof and discharging it therefrom into a reaction zone, and
   at the dischange end of said burner means, transpiring through a porous diffusion means a hydrogen-containing fuel gas or vapor at a fouling preventive rate along and surrounding each boundary of each such enclosed feedstock vapor-containing steam.
2. The process of claim 1 wherein said feedstock vapor is mixed with a hydrogen-containing fuel and an oxygen-containing gas to form a hydrolysis reactant mixture prior to discharge from said burner means.
3. The process of claim 2 wherein the reactant mixture is discharged from said burner means as a single stream thereof.
4. The process of claim 1 wherein said metal or metalloid halide feedstock is a silicon halide.
5. The process of claim 1 wherein said metal or metalloid halide feedstock is silicon tetrachloride.
6. The process of claim 1 wherein said transpirant fuel is hydrogen.

* * * * *